United States Patent

[11] 3,596,111

[72] Inventor Jerome Danforth Harr
San Jose, Calif.

[21] Appl. No 833,047
[22] Filed June 13, 1969
[45] Patented July 27, 1971
[73] Assignee International Business Machines Corporation
Armonk, N.Y.

[54] SOLENOID ENERGIZING CIRCUITRY
2 Claims, 2 Drawing Figs.

[52] U.S. Cl. 307/252 Q, 307/252 K, 307/242, 307/305, 317/148.5
[51] Int. Cl. H03k 17/06, H03k 17/72
[50] Field of Search 307/252.90, 253.53; 252 Q, 252 K; 317/142, 148.5

[56] References Cited
UNITED STATES PATENTS

| | | | |
|---|---|---|---|
| 3,205,378 | 9/1965 | Kline | 320/252.53 |
| 3,333,175 | 7/1967 | Klyce | 317/142 |
| 3,417,296 | 12/1968 | Wallentowitz | 307/252.90 |
| 3,423,641 | 1/1969 | Von Feldt | 317/148.5 |

*Primary Examiner*—Donald D. Forrer
*Assistant Examiner*—Harold A. Dixon
*Attorneys*—Hanifin and Jancin and George E. Roush

ABSTRACT: Varying unidirectional voltage energizing circuitry for electric devices, solenoids for example, to be energized selectively with maintained silicon controlled rectifiers (SCR) and the like is embodied with smaller, less expensive, lighter and more reliable than conventional filtered direct current circuit embodiments. Full (or half) wave rectified sine wave voltage is applied across a series connected solenoid and SCR device or a parallel arranged multiple of solenoids and SCR devices connected in series. Conventional electric gating pulses are applied to the gate electrodes of the SCR devices for initiating conduction in the conventional manner. Fall of energizing potential below the voltage level corresponding to minimum holding current is rendered ineffective to extinguish conduction by a transistor and series resistor maintaining a small current flow through the SCR device(s) until the value of energizing potential again rises above the voltage level of minimum holding current. The series resistor defines the maintaining holding current. Diodes are interposed between the combinations of series connected solenoid and SCR devices to isolate them one from another permitting energization of the solenoids at differing times and for differing time periods.

Figure 1:
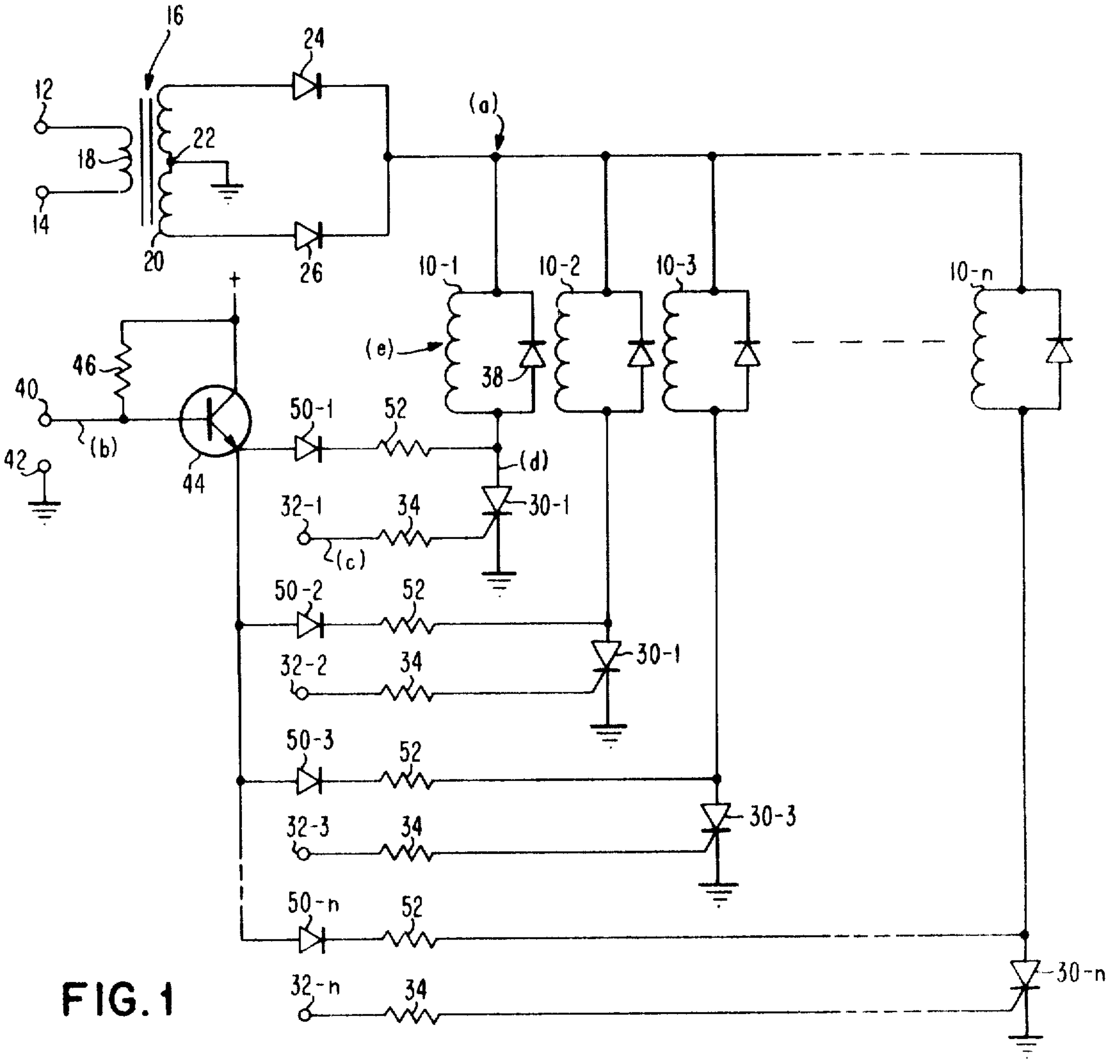

INVENTOR
JEROME D. HARR

BY George E. Roush
ATTORNEY

SOLENOID ENERGIZING CIRCUITRY

The invention stems from the same development as that of the copending U.S. Pat. Application Ser. No. 829,642 of Reynold Benjamin Johnson and Ralph Eugene Marrs for a "Mechanical Power Transmission System" filed on the 2nd day of June 1969 and thereafter allowed. Reference to the corresponding U.S. patent issuing on that copending application will aid in understanding the invention.

The invention relates to circuitry for energizing electric devices selectively with silicon controlled rectifiers, and it particularly pertains to such circuitry for energizing solenoids with unfiltered rectified sine wave voltages, but it is not limited to such power sources.

Conventional electromagnetic and mechanical mechanisms requiring solenoid operation, electromagnetic brakes, high current switching and the like, operate under the control of and in conjunction with solid-state electronic circuitry energized by relatively low direct potential sources. The electromagnetic solenoids, brakes and the like, usually require higher potential necessitating the use of a separate electric power supply. This power supply, in turn, requires bulky, heavy, and expensive filter components often prone to voltage breakdown. Some progress has been made in the development of filter circuits using various types of resistors in place of inductors but relying on large capacitors which are prone to puncturing and thereby requiring the expenditure of considerable time and effort in replacement with a new expensive capacitor.

Operation of lamps and other light load devices is possible with unfiltered but rectified sine wave voltages particularly under the control of circuitry comprising a silicon controlled rectifier (SCR) device. Brief descriptions of such arrangements are available in the following literature:

IBM Technical Disclosure Bulletin, Vol. 8, No. 3, Aug. 1965, p. 453, "Latching Indicator Driver" of A. Croisier, IBM Technical Disclosure Bulletin, Vol. 11, No 1, June 1968, pp. 64—65, "Magnet Driver Circuit" of C. C. Hanson and B. E. Maring.

The objects of the invention indirectly referred to hereinbefore and those which will appear as the specification progresses are attained in a single transistor control circuit for maintaining a low value of current flow through one or a multiple of silicon controlled rectifier (SCR) devices, each arranged to draw current through a corresponding electric device, such as a solenoid, on the application of conventional gating voltage and a source of energy delivering varying unidirectional voltage.

According to the invention full (or half) wave rectified sine wave (or similar form) voltage is applied across a parallel arranged multiple of electric devices and SCR devices connected in series. Conventional electric control pulses are applied to the gate electrodes of the SCR devices for initiating conduction in the conventional manner. Fall of energizing potential below the voltage level corresponding to minimum holding current for the SCR device is rendered ineffective to extinguish conduction by applying a low voltage across the anode-cathode circuit of the SCR devices sufficient to maintain a small holding current flow until the value of energizing potential again rises above the voltage level of minimum holding current. A single transistor is sufficient to accommodate a large number of SCR devices. One holding current defining resistor is required for each SCR device or group of devices controlled simultaneously. Diodes are interposed between the SCR devices to isolate them one from another permitting energization of the solenoids or electric devices at differing times and for differing time periods as desired for the particular application controlled by the solenoids.

Figure 2:
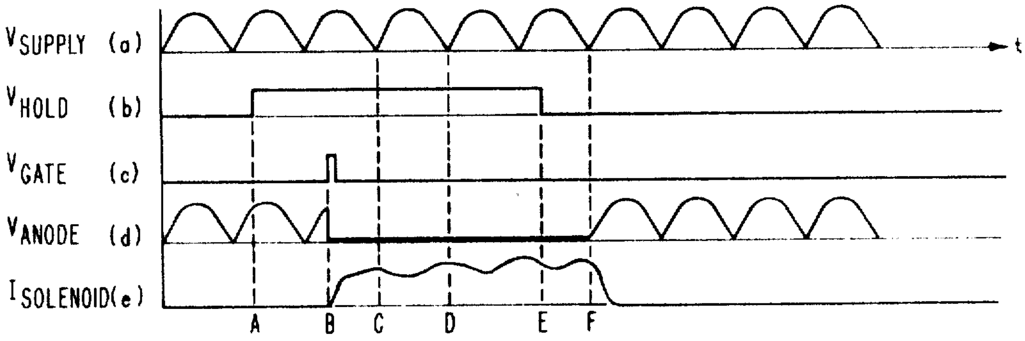

In order that all of the advantages of the invention may be attained in practice, a description of a preferred embodiment is given hereinafter, by way of example only, with reference to the accompanying drawing, forming a part of the specification and in which:

FIG. 1 is a schematic diagram of solenoid energizing circuitry according to the invention; and FIG. 2 is a graphical representation of waveforms observed at various parts of the circuit of FIG. 1 in the operation of the circuitry according to the invention.

The schematic diagram of FIG. 1 is an example of circuitry according to the invention for energizing a multiple of electromagnetic devices 10–1, ... 10–*n*, in a multisegment character printing device such as that described in the above mentioned copending U.S. Pat. Application, Ser. No. (not yet assigned—IBM Docket No. SA9-68-059). Power for operating the electric devices 10–1...10–*n*, which may be electromagnets or solenoids, is obtained from a conventional power line for example delivering 120 volts 60 cycles alternating current, to terminals 12 and 14 connected to a transformer 16. The transformer 16 has a primary winding 18 and a secondary winding 20 at the center of which is a tap 22 shown here connected to ground. The ratio of the windings 18 and 20, for example, is such that 48 volts r.m.s., or approximately 70 volts peak rectified voltage obtains at the cathodes of a pair of rectifiers 24, 26 connected in a conventional full wave rectifying circuit. The electric devices 10–1...10–*n* are controlled by corresponding silicon controlled rectifier (SCR) devices 30–1...30–*n*, having the anode electrodes individually connected to the corresponding electric devices 10–1...10–,and having the cathodes connected in common to ground. Gating voltages for initiating conduction of the SCR devices 30–1...30–*n*,are applied at terminals 32–1...32–, by way of series resistors 34. As thus far described, the circuit is operative on a rectified half cycle theoretically. Gating voltage of the proper amplitude applied at terminals 32 will initiate conduction in the SCR devices 30 at the time the varying unidirectional potential across the series connected SCR devices 30 and devices 10 reaches the striking potential. Thereafter, control is lost except for extinction when the voltage drops to the level near the end of the half cycle corresponding to minimum holding current. Diodes 38 are connected across the electric devices 10 to prevent self induced reverse voltage from becoming any larger than a few tenths of a volt as the energizing voltage drops to zero. The diodes 38 also aid in cutting off conduction near the end of the half cycle by shunting the associated SCR device through the low impedance of the power supply as the anode of the SCR device tends to rise. Silicon diodes have formed voltage drops of 0.6 volt and germanium diodes of 0.3 volt; the latter are therefore preferable in most applications.

Operation on a single half cycle of rectified voltage is, of course, impractical for many electric devices. According to the invention, operation over as many half cycles as is desired is obtained by applying a direct holding voltage at the terminals 40 and 42. A transistor 44 has a collector electrode to which filtered direct potential is applied, of value of 12 volts for example, a base electrode connected to the terminal 40 and to the 12 volt direct potential supply by means of a bias resistor 46, and an emitter electrode. The emitter electrode of the transistor 44 is connected to the anode electrodes of a multiple of isolating diodes 50–1...50–, having cathode electrodes connected individually by series resistors 52 to the junctions between the electric devices 10 and the SCR devices 30. The transistor 44 is effective when rendered conductive to place a low potential of value at the anodes of each of SCR devices 30 sufficient to draw holding current, of the order of 1 milliampere, for example, through the SCR devices 30.

The operation of the circuitry according to the invention is readily ascertained by reference to FIG. 2. The curve of FIG. 2(*a*) represents the unidirectional varying energizing potential delivered at the cathodes of the rectifiers 24 and 26. The peaks of these half cycles are approximately 70 volts above reference potential shown in the circuit as ground. The curve 2(*b*) represents the maintaining voltage between terminals 40 and 42 applied to all SCR devices for enabling conduction from the time instant A to the time instant E and for maintaining conduction of the selected SCR devices 30 from the time instant B when the control pulse is applied to the time instant F which occurs at the fall of the varying power supply potential below the extinction voltage in the half cycle after the maintaining voltage is removed at a time instant E. The curve 2(*c*) represents the gating pulse for one SCR device at the time instant B and the anode voltage of that one SCR device is represented by the curve 2(*d*). .From the time interval B to F, the anode voltage is of the order of 1 volt. At the time instants C and D, conduction would cease if it were not for the holding current. At time interval E, the holding current is cut off but the SCR device remains in conduction due to solenoid current. The final curve 2(*e*) represents the current flowing in the solenoid connected in series with the one SCR device. Other SCR devices will be controlled accordingly at desired time instants and for desired time periods.

Thirteen actuating magnets for the mechanical power transmission system disclosed in the above mentioned copending U.S. Pat. Application Ser. No. (not yet assigned—IBM Docket No. SA9-68-059) are energized selectively with a circuit arrangement similar to that shown in FIG. 1. An equivalent filtered direct potential supply would have required a 500 microfarad 50-volt capacitor weighing about a pound and occupying a cylindrical space of approximately 3 inches by 2 inches in diameter. Such a component would be undesirable in the interests of compactness and lightness as well as incompatible with desirable semiconductor circuit card mounting arrangements. The transformer would be required in either case, but with the circuit according to the invention, a transformer that is smaller and lighter of 2: 1 or better is sufficient due to lower surge characteristics. For the same underlying reasons, a four diode bridge rectifier and commercially available untapped transformer combination frequently will be found less expensive than a full wave two-diode arrangement with a specially designed transformer. Many arrangement having less stringent power requirements can use a half wave rectifying circuit but the cost of an additional diode or two will usually be justified in better operation and a less expensive transformer.

Applications with a great number of electric devices, such as a 120-character line printer with electromagnet print hammers operating at differing times as for 44 character-type wheels are preferably divided into a plurality of control groups for supplying maintaining current. In such arrangements, the circuitry according to the invention possesses an additional advantage over filtered direct potential arrangements in that direct current interrupting circuitry necessary for such arrangements becomes expensive and complex as the current requirements reach large numbers. Thus, the circuitry according to the invention is additionally advantageous even in stationary installations, as well as in portable and transportable equipment.

For very heavy loads, especially those with highly inductive components, the circuitry is also advantageous for a single load, including paralleled elements, and a single SCR device or devices in parallel in lowering the cost, size and weight of the required power supply beyond the cost of the added transistor(s) and resistor(s).

While the invention has been shown and described particularly with reference to a preferred embodiment thereof, and various alternative structures have been suggested, it should be clearly understood that those skilled in the art may effect further changes without departing from the spirit and scope of the invention.

The invention claimed is:

1. A solenoid energizing circuit, comprising:

a transformer having a primary winding and a secondary winding, rectifying means connected to said secondary winding for producing in response to sine wave voltage applied to said primary winding a unidirectional potential varying cyclically in amplitude from a useful range of values down to a substantially ineffective range, a multiple of solenoids each having one terminal connected to a common point in the potential producing circuit, a multiple of silicon controlled rectifiers, anode and gate electrodes and having cathode electrodes connected to another common point in said potential producing circuit, the anode electrodes of said silicon controlled rectifiers being individually connected to the other terminals of said solenoids, gating circuitry connected to the gate electrodes of said rectifiers for establishing current flow through predetermined ones of said solenoids at times when said potential is greater than said value below which it is ineffective, a transistor having a base electrode, a collector electrode and an emitter electrode, a diode and a resistor connected in series between the anode electrode of each of said rectifiers and a common point in the emitter electrode circuit of said transistor, direct potential means for energizing said gating circuitry and for biasing the base and collector electrodes of said transistor, and circuitry for applying a direct voltage on the base electrode of said transistor for maintaining current flow in each solenoid and rectifier combination during the periods when the amplitude of said varying unidirectional potential applied thereacross is below said useful range of values.

2. A solenoid energizing circuit, comprising:

a source of unidirectional potential varying cyclically in amplitude from a useful range of values down to a substantially ineffective range, a multiple of solenoids each having one terminal connected to a common point in said source of potential, a multiple of silicon controlled rectifiers, anode and gate electrodes and having cathode electrodes connected to another common point in said source potential, the anode electrodes of said silicon controlled rectifiers being individually connected to the other terminals of said solenoids, gating circuitry connected to the gate electrodes of said rectifiers for establishing current flow through predetermined ones of said solenoids at times when said potential is greater than said value below which it is ineffective, a transistor having a base electrode, a collector electrode and an emitter electrode, a diode and a resistor connected in series between the anode electrode of each of said rectifiers and a common point in the emitter electrode circuit of said transister, direct potential means for energizing said gating circuitry and for baising the base and collector electrodes of said transistor, and circuitry for applying a direct voltage on the base electrode of said transistor for maintaining current flow in each solenoid and rectifier combination during the periods when the amplitude of said varying unidirectional potential applied thereacross is below said useful range of values.